(12) United States Patent
Parthasarathy

(10) Patent No.: US 8,229,980 B2
(45) Date of Patent: Jul. 24, 2012

(54) STATE BUCKETS

(75) Inventor: Srivatsan Parthasarathy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1120 days.

(21) Appl. No.: 12/111,967

(22) Filed: Apr. 30, 2008

(65) Prior Publication Data

US 2009/0276442 A1    Nov. 5, 2009

(51) Int. Cl.
*G06F 17/30* (2006.01)
(52) U.S. Cl. ........................................ 707/821
(58) Field of Classification Search .................. 707/100, 707/E17.009
See application file for complete search history.

(56) References Cited

U.S. PATENT DOCUMENTS

| | | | |
|---|---|---|---|
| 7,003,767 B2 | 2/2006 | Larkin | |
| 7,107,588 B2 | 9/2006 | Gentry | |
| 7,287,259 B2 | 10/2007 | Grier et al. | |
| 2005/0050320 A1 | 3/2005 | Wassmann et al. | |
| 2005/0091259 A1 | 4/2005 | Parthasarathy et al. | |
| 2005/0262499 A1 | 11/2005 | Read | |
| 2006/0036570 A1 | 2/2006 | Schaefer et al. | |
| 2006/0074621 A1* | 4/2006 | Rachman | 703/22 |
| 2007/0044039 A1* | 2/2007 | Amadio et al. | 715/847 |
| 2007/0061372 A1 | 3/2007 | Appavoo et al. | |
| 2008/0028390 A1* | 1/2008 | Fors et al. | 717/174 |
| 2009/0164492 A1* | 6/2009 | Cotichini et al. | 707/101 |

OTHER PUBLICATIONS

"Deploying Applications to Locked Down Desktops", Thinstall Whitepaper, 2005, Thinstall, pp. 11.
Noyes, "Deploy and Update Your Smart Client Projects Using a Central Server", May 2004, MSDN Magazine, Microsoft Corporation, pp. 9.
Baumann, et al. "Improving Operating System Availability with Dynamic Update" In Proceedings of the 1st Workshop on Operating System and Architectural Support for the On-Demand IT Infrastructure, Oct. 2004, pp. 7.
Irmert, et al. "Towards Runtime Adaptation in a SOA Environment" pp. 5.

* cited by examiner

*Primary Examiner* — Kuen Lu
*Assistant Examiner* — Deric Ortiz
(74) *Attorney, Agent, or Firm* — Wolfe-SBMC

(57) ABSTRACT

Techniques involving state buckets are described. In an implementation, a plurality of axes are defined, each corresponding to a proposed separation or unification of state for software. For each of the axes, one or more scenarios are determined that are enabled by the defined separation or unification of the state for the software. The defined plurality of axes are then prioritized, one to another, based on respective said one or more scenarios. A plurality of buckets are defined based on the prioritizing, each corresponding to one or more said axes.

20 Claims, 5 Drawing Sheets

STATE BUCKETS

BACKGROUND

Software is continually developed to provide a wide range of functionality. For example, software may be configured as applications that are developed for productivity (e.g., word processing and spreadsheets), to abstract functionality of a computing device (e.g., an operating system), to locate information (e.g., a browser), and so on. Traditional techniques that were employed to manage software (e.g., deploy and update the software), however, were often complicated by how the software was implemented.

For example, state of components of the software (e.g., an application) may be intertwined such that each is dependent, one to another. Further, state of components of applications may even be dependent on state of components of another application, e.g., interdependency between components of an application and an operating system and the state of those components. This intertwined nature may therefore cause the state of each of these components to be difficult to address on their own. Therefore, traditional techniques that were used to manage the software were forced to address the software as a whole, even in situations where state of a single component was at issue.

SUMMARY

Techniques involving state buckets are described. In an implementation, a plurality of axes are defined, each corresponding to a proposed separation or unification of state for software. For each of the axes, one or more scenarios are determined that are enabled by the defined separation or unification of the state for the software. The defined plurality of axes is then prioritized, one to another, based on respective scenarios. A plurality of buckets is defined based on the prioritizing, each corresponding to one or more of the axes.

In another implementation, each of a plurality of components of an application is classified into one of a plurality of buckets. The plurality of buckets includes a static bucket to contain state of the components of the application that relate to a static state of the application and an admin bucket to contain state of the components of the application that relate to administration. The plurality of buckets also includes a user bucket to contain state of the components of the application that relate to user settings and a discardable bucket to contain state of the components of the application that are temporary. A manifest is generated that contains a result of the classification. The application is then updated using the manifest such that an update is applied to components classified in one of the buckets without being applied to components classified in another one of the buckets.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional software deployment and updating (e.g., servicing) is complex and unreliable in part due to the intertwining of state for components of the software, e.g., interdependency of values for variables that comprise at least a portion of the software at a particular point in time. For example, the state of components of an application may be intertwined between themselves and even between components of a different item of software. For example, components of an application may have interdependencies between themselves as well as with components of an operating system. Therefore, because state may be dynamic in that in may change in time and volatile in that it may be lost (e.g., upon failure of the software) traditional techniques that were used to manage the software were further complicated by these interdependencies.

State bucket techniques are described. In an implementation, techniques are described to arrive at a plurality of buckets that address key scenarios involving state. For example, the plurality of buckets may be based on scenarios that are enabled for a proposed separation or unification of state, further discussion of which may be found in relation to FIG. 3. These buckets may then be used to manage software.

For example, a legacy application may include a plurality of components. A module (e.g., a bucket module) may be executed to classify state of components of the legacy application into respective ones of a plurality of buckets, such as the buckets that were derived in the previous implementation. A manifest may then be generated that contains a result of the classification which may be used to update the application, such as by applying an update involving state of components in one bucket without affecting state defined in another bucket, further discussion of which may be found in relation to FIG. 4. In another example, a module may be employed to intercept a request to mange access to information related to state of the application using the manifest, further discussion of which may be found in relation to FIG. 5. Thus, the buckets may be used to separate and/or unify state of components of an application such that the application may be more efficiently managed.

In the following discussion, an example environment is first described that is operable to employ state bucket techniques. Example procedures are then described that may operate in the example environment, as well as in other environments. Accordingly, reference to the example environment is made by way of example as an aid to the discussion and is not limited to that environment.

Example Environment

Figure 1:
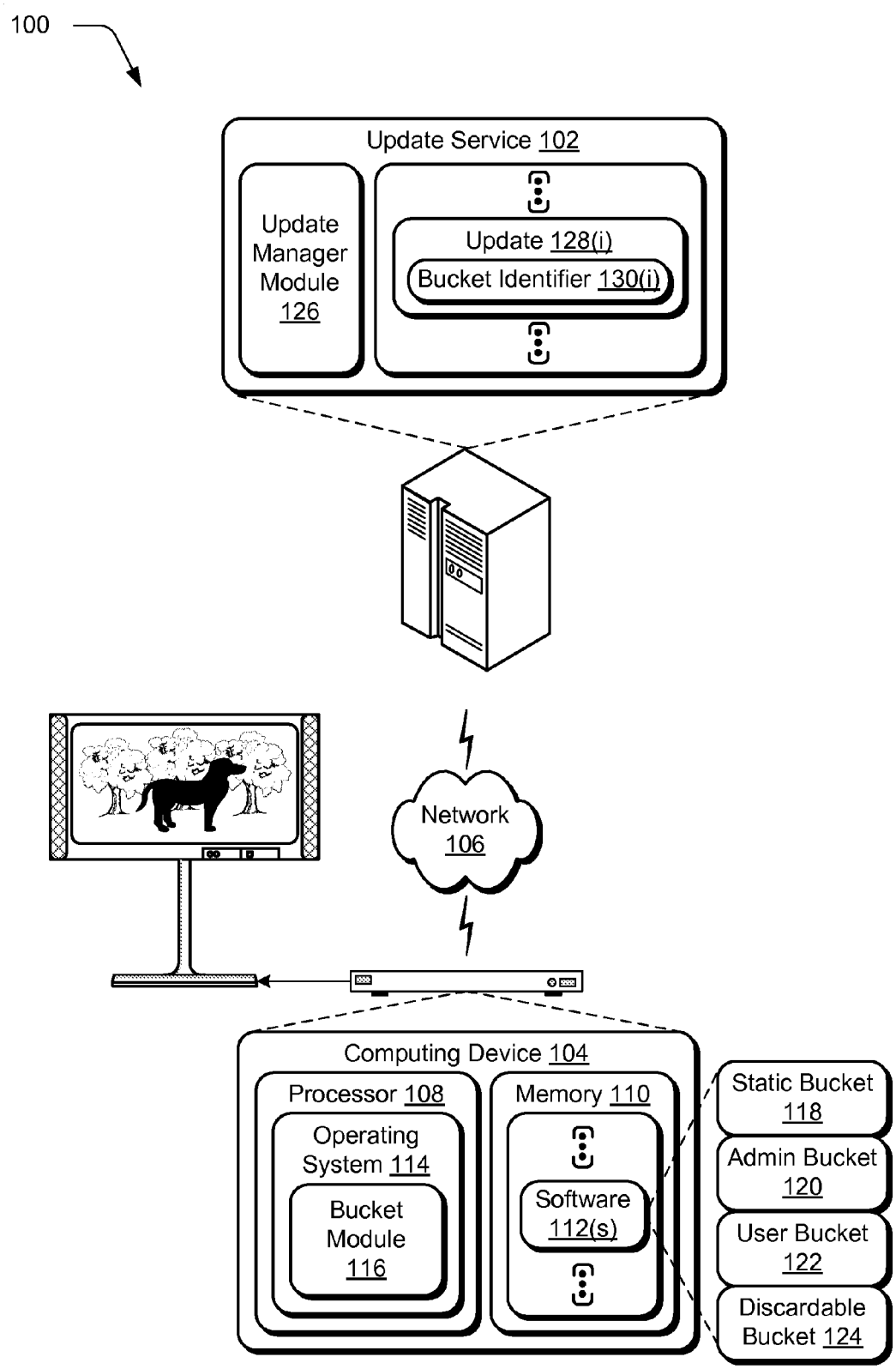
FIG. 1 is an illustration of an environment in an example implementation that is operable to employ software update techniques.

FIG. 1 is an illustration of an environment 100 in an example implementation that is operable to employ software update techniques. The illustrated environment 100 includes an update service 102 and a computing device 104 that are communicatively coupled, one to another, via a network 106. The computing device 104 may be configured in a variety of ways. For example, the computing device 104 may be configured as a computer that is capable of communicating over the network 106, such as a desktop computer, a mobile station, an entertainment appliance, a set-top box communicatively coupled to a display device, a wireless phone, a game console, and so forth. Thus, the computing device 104 may range from full resource devices with substantial memory and processor resources (e.g., personal computers, game consoles) to a low-resource device with limited memory and/or processing resources (e.g., traditional set-top boxes, hand-held game consoles).

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The update service 102 is illustrated as being implemented via a server, which may be representative of one or more servers. Further, the computing device 104 is illustrated as including a processor 108 and memory 110. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 110 is shown, a wide variety of types and combinations of memory may be employed, such as random access memory (RAM), hard disk memory, removable medium memory, and other types of computer-readable media.

The computing device 104 is also illustrated as including one or more items of software 112(s) in memory 110, which are executable by the processor 108. The software 112(s) may be configured in a variety of ways, such as an application, plug-in module that extends the functionality of an application, or other software. Another example of software is an operating system 114 that is illustrated as being executed on the processor 108 and is storable in memory 110.

Figure 2:
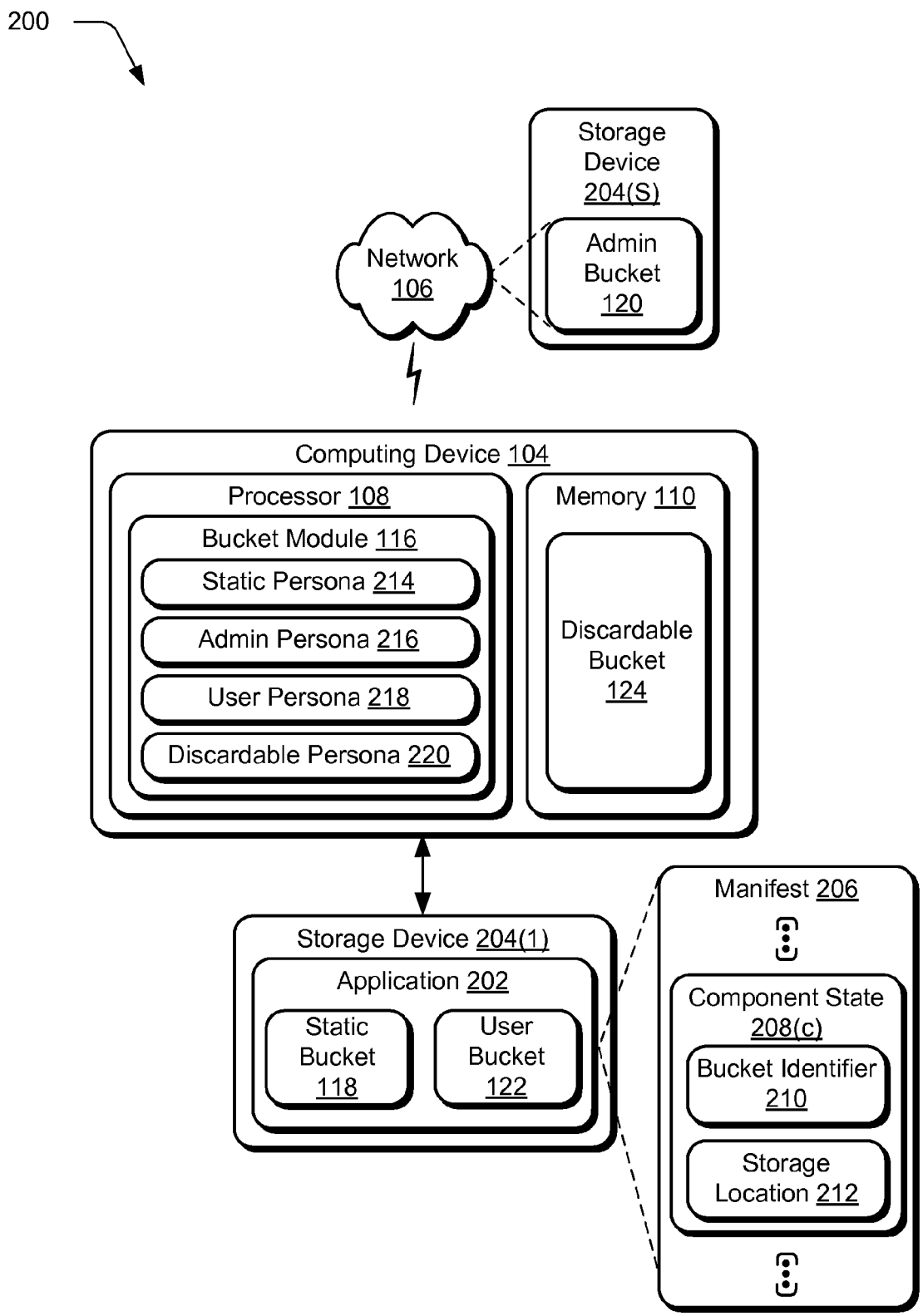
FIG. 2 is an illustration of an environment in an example implementation show a bucket module of FIG. 1 in greater detail as managing software of FIG. 1 configured as an application having components that are distributed across a plurality of storage devices.

The operating system 114 is further illustrated as including a bucket module 116, which is representative of functionality related to "bucketing" techniques regarding software 112(s) management. Although illustrated as part of the operating system 114, the bucket module 116 may be configured in a variety of other ways, such as a "stand alone" module as illustrated in FIG. 2, as part of one or more of the items of software 112(s), and so on.

As previously described, traditional software deployment and servicing is complex and unreliable in part due to intertwined state of components of software itself as well as with other software, e.g., between components of an application, components of an application and an operating system, and so on. Accordingly, techniques are described in which management of software 112(s) state is organized according to a plurality of buckets, which may be used to enable a variety of different scenarios, which may be related to deployment, execution and update of the software 112(s).

As illustrated in FIG. 1, for instance, software 112(s) may be configured accordingly to the plurality of buckets, examples of which are illustrated as a static bucket 118, an admin bucket 120, a user bucket 122 and a discardable bucket 124. These buckets may be derived in a variety of ways to support a variety of different scenarios. An example implementation of bucket derivation may be found in relation to FIG. 3.

The plurality of buckets may be used to separate and/or unify state across components of the software 112(s) and between software 112(s) along one or more particular axes that are used to define the bucket. For example, the user bucket 122 may be used to contain user state (e.g., preferences related to the user) across software 112(s) that pertains to a particular user. State within the user bucket 122 may be partitioned (e.g., separated) by identities, e.g., application and/or component identities. Continuing with the previous example, the user bucket 122 may partition state within the bucket based on respective identity of software 112(s) to avoid overlaps or collisions using a namespace.

The static bucket 118 is representative of components of the software 112(s) that relate to a static state of the software 112(s), such as binaries, manifests, schematized settings with default values, resources, category definitions category membership declarations, dynamic linked libraries, static registry keys, default configuration, and so on. An administrator of the software 112(s) (e.g., an end consumer or a network administrator), for instance, may drag applications and/or updates provided by a developer of the software 112(s) and drop them into the static bucket 118 when the software 112(s) is to be deployed.

The administrator, for instance, may control what components to include in an administrative bucket as well as the layout of the bucket, e.g., a schema employed by the bucket. In an implementation, the administrator does not modify the updates provided by the developer of the software 112(s). However, the administrator may override behavior through configurability provided by the developer by authoring settings/policy data which are "placed" in the admin bucket 120. Thus, the admin bucket 120 may be populated by the administrator with configuration and policy, such as to override default configurations, control runtime behavior, and so on of binaries that make up the static portion of the application written by a developer of the application. In an implementation, this population may be performed using offline tools (e.g., an image manager) in accordance with a schema described in the static bucket 118.

The user bucket 122 is representative of state of the software 112(s) that is controlled by the user. For example, the software 112(s) may help a user modify state in this bucket in the context of using the software 112(s). The discardable bucket 124 is to contain the state components of the software 112(s) that are temporary, such as components written by the software 112(s) at runtime, temporary files, and so on.

In an implementation, state within each of these buckets has a lifetime. For example, user preferences with the user bucket 122 may be scavenged after a previous version of the software 122(s) is no longer in use. Administrative preferences in the admin bucket 120 may be removed from the network after an administrator retires the software 112(s), and so on. The lifetime of the discardable bucket 124 may be reevaluated at each launch of the software 112(s) to check for consistency.

By separating and/or unifying state accordingly to the plurality of buckets, a variety of different scenarios may be enabled, an example of which is depicted in FIG. 1 as being implemented by the update service 102. The update service 102 is illustrated as including an update manager module 126 which is representative of functionality to provide updates 128(i) to the software 112(s). Updates 128(i) may be configured in a variety of ways, such as to provide additional functionality (e.g., a new feature), a "fix" (e.g., to protect against a known vulnerability that may be exploited by a malicious party) and/or address other update considerations.

The updates 128(i) are illustrated as including a respective bucket identifier 130(i) that identifies a particular bucket to which the update 128(i) pertains. Accordingly, upon receipt of the update 128(i) the bucket module 116 may apply the update 128(i) to a respective one of the buckets (e.g., the static bucket 118, admin bucket 120, and so on) without disturbing state of components of the software 112(s) in the other buckets, e.g., the user bucket 122.

The software 112(s) may be configured in a variety of ways to employ the state bucket techniques. For example, the software 112(s) may be configured when created such that state is separate and/or unified across the plurality of buckets, e.g., the static, admin, user and discardable buckets 118, 120, 122, 124. In another example, "legacy" software 112(s) may be configured to employ the state bucket techniques, further discussion of which may be found in relation to the following figure. In a further example, state of components of the software 112(s) may be maintained across a plurality of computing and storage devices, an example of which is also shown in the following figure.

FIG. 2 illustrates an example environment showing the bucket module 116 of FIG. 1 in greater detail as managing the software 112(s) configured as an application 202 having components that are distributed across a plurality of storage devices 204(1) and 204(S). By separating and/or unifying state between buckets, an application 202 may be maintained across a plurality of storage devices, such as storage device 104(1)-204(S), to generate a runtime image of the software 112(s) for execution.

Storage device 104(1), for example, is illustrated as being locally accessible to the computing device 104, such as a USB flash drive. The storage device 204(1) includes state of components of the application 202 that "fall within" the static bucket 118 (e.g., binaries) and the user bucket (e.g., user settings). Additionally, the memory 110 of the computing device 104 is illustrated as including state to be included in the discardable bucket 124. The storage device 204(S) is illustrated as including the admin bucket 120, which is accessible via a network 106, e.g., from a web service, a server of an enterprise that maintains the computing device 104, and so on. A variety of other examples are also contemplated.

The bucket module 116, which is illustrated as being executed on the processor and is storable in memory 110, may then construct a runtime image of the application based on state of the respective buckets for each of the components, which in this instance are the static bucket 118, the admin bucket 120, the user bucket 122 and the discardable bucket 124.

For example, the bucket module 116 may construct the application 202 using a manifest 206. In some embodiments, each application 202 is associated with its own manifest 206. The manifest 206 describes state of each of the components in a group that can be used to construct a runtime image of the application 202 on the computing device 104. The manifest 206 in the illustrated instance specifies component state 208(c) (where "c" may be an integer from one to "C" and therefore reference to component state may be made in single or plural form) to be used in constructing the application 202.

The component state 208(c) may be thought of as a state for each of the components of the software 112(s) as defined by the plurality of buckets. In other words, each component that makes up the software may have state that involves one or more of the buckets, which may be referred to as component state 208(c) in the following discussion.

The component state 208(c) referenced in the manifest 206 may also include a bucket identifier 210 to indicate membership of the component state 208(c) in a particular bucket and a storage location 212 (e.g., physical storage location) of the component state 208(c). The manifest 206 may also be used to specify a version of a component state 208(c) that is appropriate for a user's location, a user's language preference(s), appropriate to resources of the computing device, e.g., the processor 108, memory 110, a particular operating system 114, and so on.

The component state 208(c) referenced in the manifest may be configured in a variety of ways. For example, the component state 208(c) may be configured as a part of executable code and/or script to construct an application image. Using the manifest 206, the bucket module 116 may create an image of the application 202 to be executed on the processor 108 of the computing device 104.

Thus, in this example the bucket module 116 may determine where the component state 208(c) is located and retrieve the component state 208(c). As illustrated, one or more of the component state can be located at a remote resource (e.g., admin bucket 120 in the storage device 204(S) that is accessible via network 106), and the bucket module 116 may submit a request to the remote resource for the one or more components located at the remote resource.

The manifest 206 may be formed in a variety of ways. For example, a developer of the application 202 may initially write the application 202 to include components in a manner which addresses the bucket techniques described herein. In another example, the bucket module 116 may be executed to add the manifest 124 to the application 202 when implemented as a legacy application, further discussion of which may be found in relation to FIG. 4.

The bucket module 116 is further illustrated as including a static persona 214 (e.g., populated by an application/component vendor), an admin persona 216, a user persona 218 and a discardable persona 220, which are associated with respective buckets, e.g., the static bucket 118, the admin bucket 120, the user bucket 122 and the discardable bucket 124. Each bucket is serviced by the persona associated with the bucket. In an embodiment, the discardable persona 220 is representative of functionality of the software 112(s) itself to manage the discardable bucket, e.g., the discardable persona may be implemented by the software 112(s) itself. For instance, a typical creator of discardable state is the application code that runs on behalf of a user and a typical entity that deletes the state is a clean-up manager of an operating system that is sued to scavenge unused space of the system. A variety of other examples are also contemplated.

In an implementation, servicing for each of the buckets is performed independent of the state in other buckets. For example, servicing of state of binaries in the static bucket 118 is not subject to the state of content of other buckets, e.g., the discardable bucket 124. Likewise, state of the static bucket 118 does not cause modifications to be made to state of other buckets, thereby ensuring repeatability and reliability of servicing. Accordingly, state of components associated with a particular bucket may be serviced regardless of the accessibility of state of components in other buckets as well as different state for the same component. For example, the lifetime of state for each of the buckets may be decoupled such that state may evolve for a particular component, e.g., to add administrative and/or user state after a static state. Therefore, the particular component of software 112(s) may have state that involves one or more of the buckets, further discussion of which may be found in relation to the following procedures.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, an example of which is the memory 110. The features of the state bucket techniques described below are platform-independent, meaning that the techniques may be implemented on a variety of commercial computing platforms having a variety of processors.

Example Procedures

The following discussion describes state bucket techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environments 100 and 200 of FIGS. 1 and 2, respectively.

Figure 3:
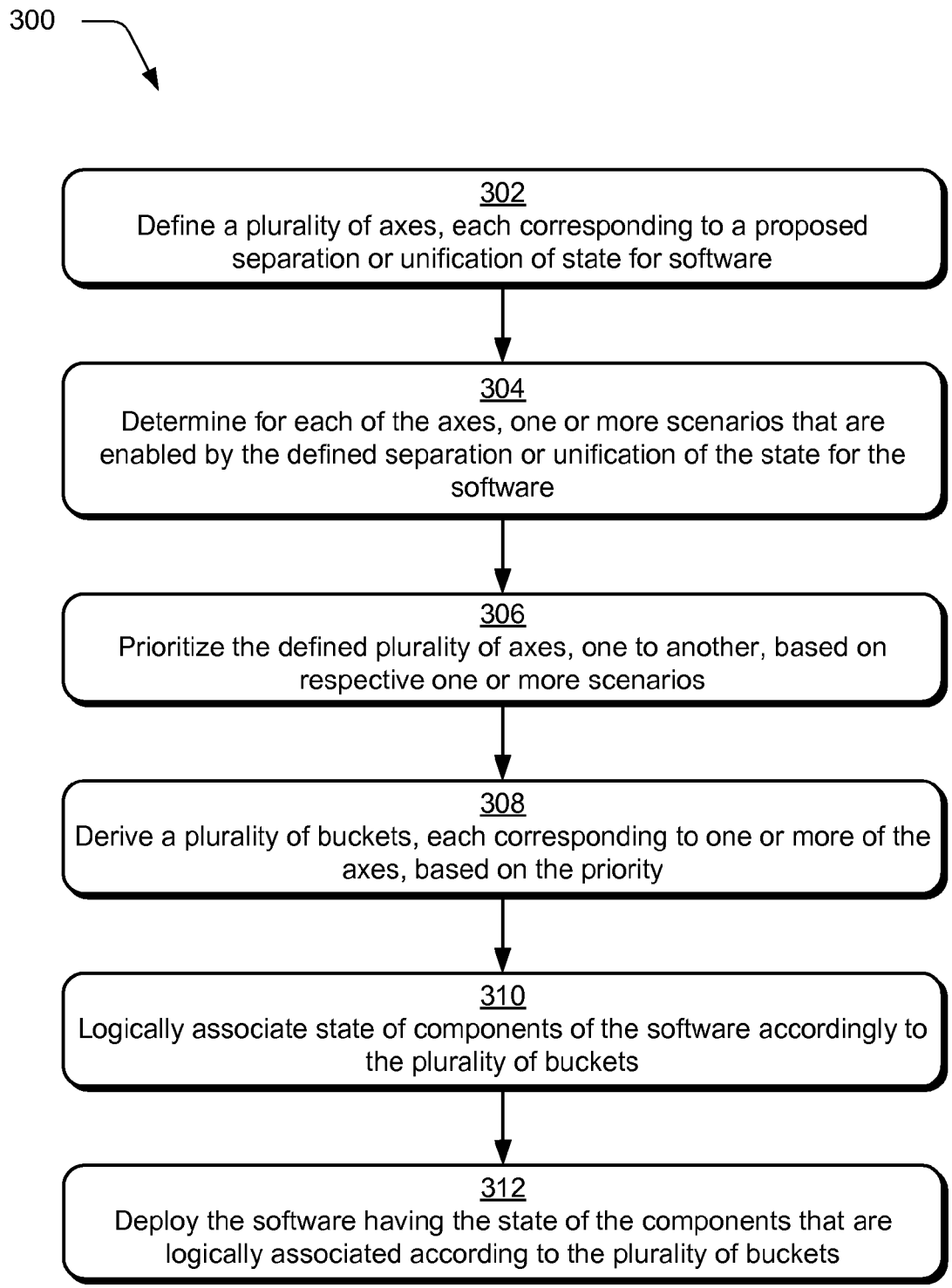
FIG. 3 is a flow diagram depicting a procedure in an example implementation in which a plurality of buckets is derived to separate and/or unite state for software.

FIG. 3 depicts an example procedure 300 in which a plurality of buckets are derived to separate and/or unite state for software. A plurality of axes are defined, each corresponding to a proposed separation or unification of state for software (block 302). For example, each axis may define a proposed separation of state e.g., applications separate from operating system, applications separate from each other, and so forth. Each axis may also define a proposed unification of state, e.g., combining user preferences together.

For each of the axes, a determination is then made as to one or more scenarios that are enabled by the defined separation or unification of the state for the software (block 304). As greater detailed below in the following, each separation axis may enable a scenario having specific functionality.

| Separation axis | Scenarios enabled |
| --- | --- |
| 1. Applications separate from operating system (OS) (composable with OS) | OS updates can be applied to an OS image and composed with the applications without reinstalling the applications.<br>OS is not reconfigured after application install/uninstall. |
| 2. Apps separate from each other | Applications install/uninstall without affecting the OS.<br>(Cache and) Run from network of applications. (in part) |

-continued

| Separation axis | Scenarios enabled |
| --- | --- |
| 3. Users from each other and from computing device. | Applications can be serviced independent of each other.<br>Arbitrary set of applications may be composed on the computing device without collisions.<br>Applications maintained as separated versions helps in adoption of new versions of applications (e.g., simultaneous execution during adoption). |
| 4. Admin configuration from application and/or component defaults. | User can install an application and use it without affecting other users or the computing device. |
| 5. User preferences from binaries. | Admin configuration can be on the network separate and composable with binaries; enables reset to factory defaults<br>Not reapplied when installing an update to the application. |
| 6. Low value and re-creatable/derivable state in a separate bucket on computing device vs. other components. | Can roam between machines and user preferences follow.<br>User preferences are not recreated when a service update is installed.<br>Enables reset to factory defaults for user |
| 7. Machine (e.g., computing device) independent state from machine specific state. | Cache, indices for performance, and temp data are not roamed.<br>High value state can be backed up, roamed and/or migrated.<br>Valuable company or personal data is not left behind on kiosk or shared machine. |

The previous section looked at scenarios that were enabled by keeping state of components separated. Equally compelling are scenarios gained by unifying state of components in a bucket, e.g., unifying components that correspond to one or more axes in a bucket. One can notice some partial overlaps with some of the separation axis above.

| Unification Axis | Scenarios Enabled |
| --- | --- |
| Developer/Static - static state (code, default settings values, localized resources, etc.) across each of the applications is unified into a single bucket which can reside on a storage device accessible via a network. | Run from network - A network administrator can provision applications to the network and service the single copy on the network. |
| Admin - administration configuration, settings overrides and policy state unified into asingle bucket which can reside on the network. | Run from network - same as above, but configuration can also be on the network allowing for computing device replacement when coupled with static and user buckets. |
| User - user preferences, user data unified into a single bucket. | Run from network. See above.<br>User state is portable, e.g., can carry user state on a USB storage device key chain, upload via network (e.g., "cloud"), and so forth. |
| Discardable - recreatable and therefore discardable state is unified to a single bucket. | Cache, indices for performance, and temp data are not roamed.<br>High value state can be backed up, roamed, migrated, and so on with addressing the discardable state |

The defined plurality of axes is then prioritized, one to another, based on respective one or more scenarios (block 306). A plurality of buckets are then derived, each corresponding to one or more of the axes, based on the priority (block 308). This may be performed in a variety of ways.

For example, when the prioritized separation axes are compared with the prioritized unification axes an overlap of scenarios may be observed. Items 3, 4, 5 and 6 from the Separation Table, for instance, overlap items in the Unification Table above. Accordingly, buckets may be created for the overlapped axes, which in this example may cover scenarios such as "run from network" and "scalable centralized management/servicing".

State of components of the software may then be logically associated according to the plurality of buckets (block 310), such as through the use of a namespace. Separating state of components, one from another, within the namespace may be achieved by sub-partitioning each bucket using application and component identities.

The software may then be deployed having the state of components that are logically associated according to the plurality of buckets (block 312). This logical association may also be configured such that state of components within a bucket are also physically located together on a same storage device.

Figure 4:
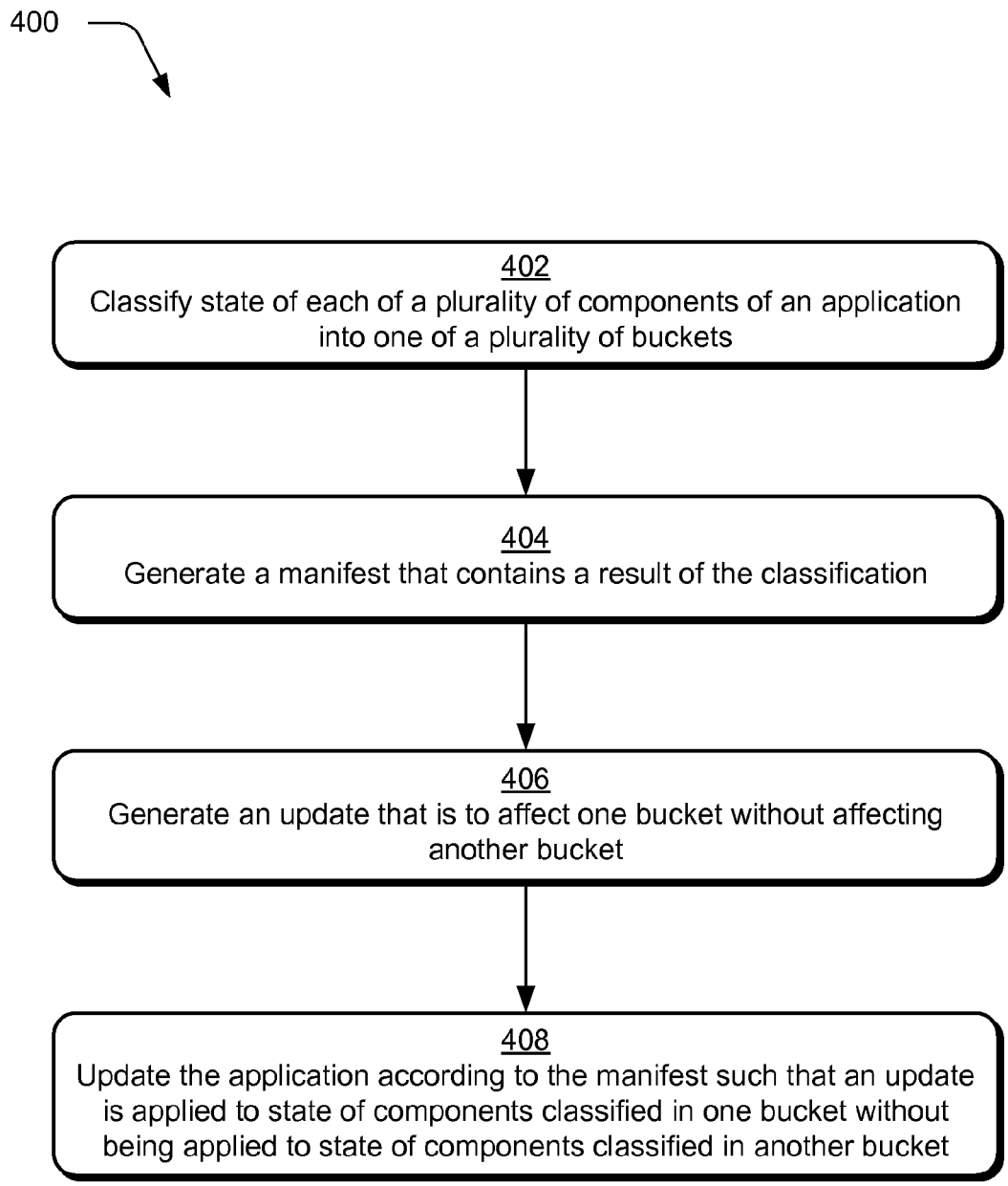
FIG. 4 is a flow diagram depicting a procedure in an example implementation in which a legacy application is managed to employ static bucket techniques.

FIG. 4 depicts a procedure 400 in an example implementation in which a legacy application is managed to employ state bucket techniques. State of each of a plurality of components of an application is classified into one of a plurality of buckets (block 402). For example, the bucket module 116 may "walk" components of a legacy application to determine the characteristics of state information handled by the respective component and accordingly which bucket is likely to contain the determined state information. In another example, the bucket module 116 may monitor execution of component of software 112(s). In an implementation, this classification may be performed dynamically to "readjust" classifications of state, such as to make an initial classification and reevaluate whether the classification is accurate.

A manifest is then generated which contains a result of the classification (block 404). The manifest 206 depicted in FIG. 2, for instance, includes a component state 208(c) that is referenced from the application 202 (e.g., it does not include the actual component state but an identifier of the component state) along with a bucket identifier 210 and a storage location 212. The bucket identifier 210 is a result of the classification, e.g., which bucket corresponds to the component 208(c). The manifest 206 may be maintained in a variety of ways, such as with the application 202, in a database maintained by the bucket module 116, and so on.

An update may then be generated that is to affect one bucket without affecting another bucket (block 406). For example, an administrative update may be generated to affect state in the admin bucket 120 without affecting state in the static or user buckets 118, 122. In another example, an update may be configured to affect state for binaries in the static bucket 118 without affecting state of components in the admin, user or discardable buckets 120, 122, 124. A variety of other examples are also contemplated.

The application may be updated according to the manifest such that an update is applied to state of components classified in one bucket without being applied to state of components classified in another bucket (block 408). Continuing with the previous example in which the application 202 is a legacy application, the manifest 206 may references component state 208(c) of the application 202 with corresponding bucket identifiers 210. The bucket module 116 may then be used to apply the update 128(i) which also has a bucket identifier 130(i) that corresponds to component state 208(c) based on the manifest 206. In this way, the bucket module 116 may determine which component state 208(c) is to be affected by the update and apply the update in a manner such that it does not affect component state that is not in the respective bucket. A variety of other implementations are also contemplated, an example of which may be found in relation to the following figure.

Figure 5:
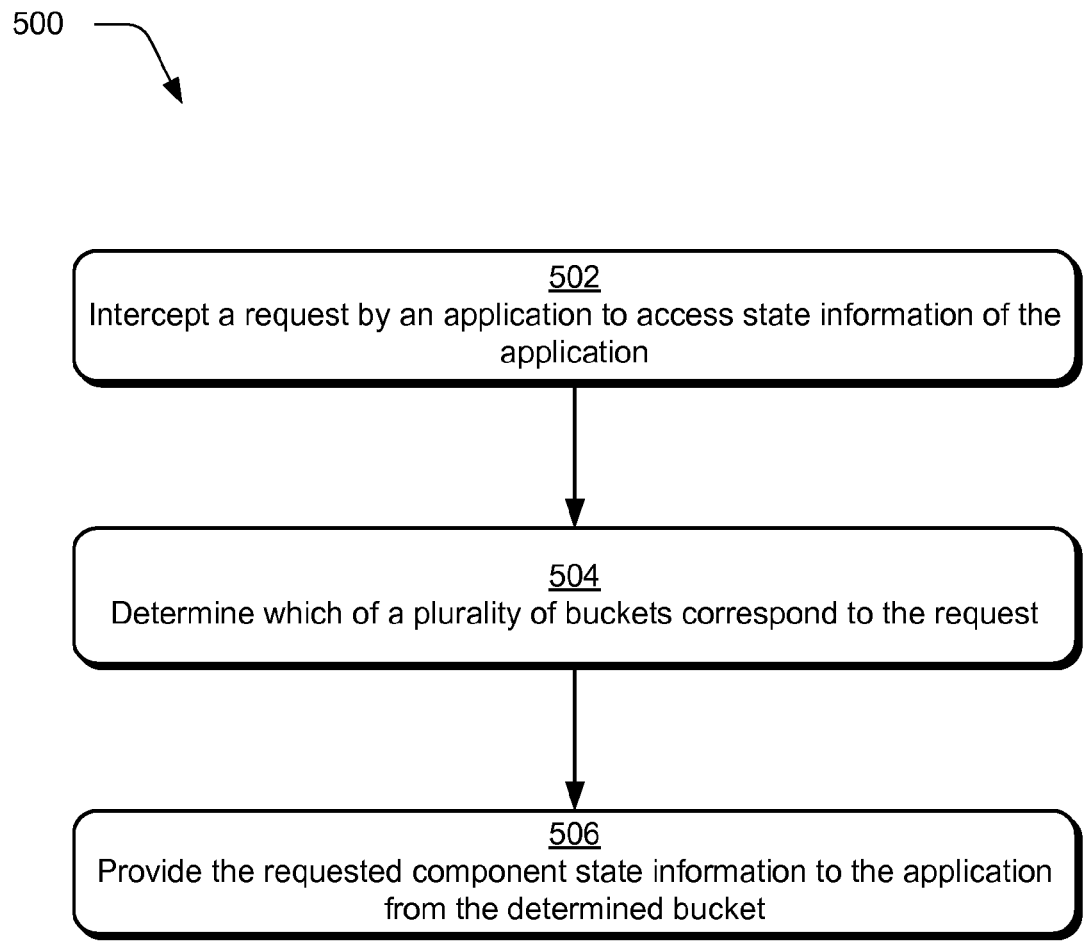
FIG. 5 is a flow diagram depicting a procedure in an example implementation in which a bucket module intercepts requests to access state information to manage the state information using a plurality of buckets.

FIG. 5 depicts a procedure 500 in an example implementation in which a bucket module intercepts requests to access state information to manage the state information using a plurality of buckets. A request by an application to access state information of the application is intercepted (block 502). For example, the bucket module 116 of FIG. 2 may be configured as a stand-alone module to intercept a request from application 202, may be configured as part of the operating system 114 as shown in FIG. 1, and so on.

A determination is made as to which of a plurality of buckets correspond to the request (block 504). For example, the bucket module 116 may "walk" the manifest 206 to find a requested component state 208(c) that corresponds to the request. The component state 208(c) may be arranged to follow the bucketing techniques previously described, such as to arrange state according to a static bucket 118, admin bucket 120, user bucket 122 and discardable bucket 124. Accordingly, the bucket module 116 may then provide the requested component state information to the application from the determined bucket (block 506). In an implementation, this interception of the request is performed without the application "being aware". Accordingly, the bucket module 116 may provide for separation and/or unification of state to enable one or more of the previously described scenarios, such as distributed storage of the application 202 as described in FIG. 2, roaming, and so on.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented on a device comprising:
    defining a plurality of axes, each corresponding to a proposed separation of state for software or unification of state for the software, the state for the software comprising processing information for the software;
    determining, for each said axis, one or more scenarios having specific functionality for the device that are enabled by the defined separation or unification of the state for the software;
    prioritizing the defined plurality of axes, one to another, based on respective said one or more scenarios; and
    deriving a plurality of buckets, each corresponding to one or more said axes, based on the prioritizing.

2. A method as described in claim 1, wherein the deriving results in a static said bucket, an admin said bucket, a user said bucket and a discardable said bucket.

3. A method as described in claim 2, wherein:
    the static bucket is to contain state of components of the software that relate to a static state;
    the admin bucket is to contain state of components of the software that relate to administration of the software;
    the user bucket is to contain state of components of the software that relate to user settings; and
    the discardable bucket is to contain state of components of the software that are temporary.

4. A method as described in claim 3, further comprising managing execution of the application using a plurality of personas that include:
- a static said persona is to manage the static bucket;
- an admin said persona is to manage the admin bucket; and
- a user said persona is to manage the user bucket.

5. A method as described in claim 1, wherein the defining is performed for a plurality of software such that the derived plurality of buckets is applicable to the plurality of software.

6. A method as described in claim 1, wherein each said bucket is a logical association of state of components of the software that share respective said one or more said axes.

7. A method as described in claim 1, wherein the deriving includes identifying overlap of at least one said scenario that corresponds with one said axis with one or more other said scenarios that correspond with another said axis.

8. A method as described in claim 1, further comprising:
- logically associating state of components of the software according to the plurality of buckets; and
- deploying the software having the state of the components that are logically associated according to the plurality of buckets.

9. A method as described in claim 1, wherein the deriving is performed to take into account a desired granularity in a number of the buckets that are derived.

10. A method comprising:
- classifying state of each of a plurality of components of an application into one of a plurality of buckets, the state of each component comprising one or more values for variables of the component at a particular point in time, wherein the plurality of buckets include:
  - a static bucket to contain state of the components of the application that relate to a static state of the application;
  - an admin bucket to contain state of the components of the application that relate to administration;
  - a user bucket to contain state of the components of the application that relate to user settings; and
  - a discardable bucket to contain state of the components of the application that are temporary;
- generating a manifest that contains a result of the classifying, the manifest describing the state of each component that can be used to construct a runtime image of the application; and
- updating the application using the manifest such that an update is applied to the state of the components classified in one said bucket without being applied to the state of the components classified in another said bucket.

11. A method as described in claim 10, wherein the application is a legacy application such that each said component has not been classified before deployment.

12. A method as described in claim 10, wherein the state of the plurality of components are stored using a plurality of storage devices.

13. A method as described in claim 10, wherein:
- said state of at least one said component is transferable between a plurality of computing devices using a portable storage device;
- each of the plurality of computing devices includes a copy of said state of one or more other said components that is stored locally; and
- said state of the at least one said component and said state of the one or more other said components are executable together on a respective said computing device when the portable storage device is communicatively coupled with the respective said computing device.

14. A method as described in claim 10, wherein the updating is performed using a respective one of a plurality of personas that include:
- a static said persona is to manage the static bucket;
- an admin said persona is to manage the admin bucket; and
- a user said persona is to manage the user bucket.

15. A computing device comprising:
- one or more modules that are implemented at least partially in hardware to perform operations comprising:
  - intercepting a request by an application to access state information of the application;
  - determining which a plurality of buckets correspond to the request, the plurality of buckets organizing state information of a plurality of components of the application, the state information of the plurality of the components comprising values for variables, wherein the plurality of buckets include:
    - a static bucket to contain state information of components of the application that relate to a static state of the application;
    - an admin bucket to contain state information of components of the application that relate to administration;
    - a user bucket to contain state information of components of the application that relate to user settings; and
    - a discardable bucket to contain state information of components of the application that are temporary; and
  - providing the requested state information to the application from the determined said bucket.

16. A computing device as described in claim 15, wherein the determination is performed using a manifest that contains a bucket identifier and a storage location for the state information of the components of the application.

17. A computing device as described in claim 15, wherein the application is a legacy application such that the state information of the components have not been classified before deployment of the legacy application.

18. A computing device as described in claim 15, wherein the state information of the plurality of the components are stored using a plurality of storage devices.

19. A computing device as described in claim 15, wherein:
- said state information of at least one said component is transferable between a plurality of computing devices using a portable storage device;
- each of the plurality of computing devices includes a copy of said state information of one or more other said components that is stored locally; and
- said state information of the at least one said component and said state information of the one or more other said components are executable together on a respective said computing device when the portable storage device is communicatively coupled with the respective said computing device.

20. A computing device as described in claim 15, wherein:
- the one or more modules include a plurality of personas;
- a static said persona is to manage the static bucket;
- an admin said persona is to manage the admin bucket; and
- a user said persona is to manage the user bucket.

* * * * *